United States Patent [19]

Ikawa et al.

[11] Patent Number: 6,034,507
[45] Date of Patent: *Mar. 7, 2000

[54] ELECTRIC VEHICLE WITH SECONDARY BATTERY POWER STORAGE SYSTEM

[75] Inventors: Kyoko Ikawa; Tatsuo Horiba, both of Hitachi, Japan

[73] Assignee: Hitachi, Ltd., Tokyo, Japan

[ * ] Notice: This patent is subject to a terminal disclaimer.

[21] Appl. No.: 09/134,708

[22] Filed: Aug. 14, 1998

Related U.S. Application Data

[63] Continuation of application No. 08/606,226, Feb. 23, 1996, which is a continuation of application No. 08/363,372, Dec. 23, 1994, abandoned.

[30] Foreign Application Priority Data

Dec. 27, 1993 [JP] Japan ..................................... 5-331000

[51] Int. Cl.[7] .................................................. H01M 10/46
[52] U.S. Cl. ........................................... 320/136; 320/132
[58] Field of Search ..................................... 320/116, 121, 320/125, 132, 134, 136, 149, 160

[56] References Cited

U.S. PATENT DOCUMENTS 5,834,922  11/1998  Ikawa et al. ............................. 320/136

FOREIGN PATENT DOCUMENTS

| 12828/89 | 1/1964 | Japan . |
|---|---|---|
| 57-13933 | 1/1982 | Japan . |
| 1-96833 | 4/1989 | Japan . |
| 3-108679 | 5/1991 | Japan . |

*Primary Examiner*—Edward H. Tso
*Attorney, Agent, or Firm*—R. William Beard, Jr.; Frohwitter

[57] ABSTRACT

The present invention provides a distributed secondary battery type power storage system capable of maintaining the soundness of the secondary battery and of efficient electric power charging and discharging operations. The secondary battery power storage system comprises a secondary battery connected to a load, a charge/discharge unit connectable to a power system and connected to the secondary battery, and a plurality of loads connected to the charge/discharge unit. A power receiving object is selected and a capacity is determined on the basis of information about the operating condition of the plurality of loads, and the surplus electric power remaining in the secondary battery after feeding electric power from the secondary battery to the load is fed to the selected power receiving object through the charge/discharge unit. The secondary battery power storage system is capable of maintaining the soundness of the secondary battery and of efficient charging and discharging operation.

4 Claims, 6 Drawing Sheets

ELECTRIC VEHICLE WITH SECONDARY BATTERY POWER STORAGE SYSTEM

CONTINUATION STATEMENT

This is a continuation application of U.S. patent application Ser. No. 08/606,226, filed Feb. 23, 1996, still pending, which is a continuation of U.S. patent application Ser. No. 08/363,372, filed Dec. 23, 1994, now abandoned.

BACKGROUND OF INVENTION

Field of Invention

The present invention relates to a secondary battery electric power storage system and, more particularly, to a battery system which is prouided with evaluation meams of the soundness and the residual power of a battery, the distribution of the surplus electric power of a battery, and the optimum charge/discharge control of a battery. Most secondary batteries for automobiles, uninterrupted power supplies and the like have been lead-acid batteries.

The diffusion of electric power storage systems and electric vehicles, and the development of secondary batteries capable of storing electric power in a high energy density have been strongly desired to meet rising necessity for the leveling of power demand and progressively increasing demand for global environmental protection, and the development of new batteries has been expected.

Various kinds of large-capacity secondary batteries including nickelcadmium batteries, nickel-metal hydride batteries, lithium batteries and sodium-sulfur batteries will come onto the market in the future for various purposes. When managing batteries, appropriate charging and discharging of batteries according to their characteristics are essential to securing the soundness and the long life of batteries. Each battery has specific charge/discharge, temperature, rate and self-discharge characteristics. These characteristics vary from battery to battery.

In view of the convenience of using the battery, the residual capacity of the battery must be known as accurately as possible. Charging systems, temperature management and methods of determining the residual capacity for each of those batteries have been proposed. There have been known, for example, methods of detecting the residual capacity on the basis of only voltage (Japanese Patent Laidopen (Kokai) Nos. 58-85179 and 61-135335), a method of managing the residual capacity on the basis of voltage and current (Japanese Patent Laid-open (Kokai) No. 52-32542), methods of managing the residual capacity on the basis of current and time (Japanese Patent Laidopen Nos. 50-2130, 56-26271 and 59-28678), a method of managing the residual capacity on the basis of measured capacitance (Japanese Patent Laid-open (Kokai) No. 2-301974), a method of managing the residual capacity on the basis of voltage, current and temperature (Japanese Patent Laid-open (Kokai) No. 2-170372), a method of managing the residual capacity on the basis of internal resistance (Japanese Patent Laid-open (Kokai) No. 3-163375), a method of managing the residual capacity that integrates current and takes charge efficiency, discharge efficiency and temperature characteristics into consideration (Japanese Patent Laid-open (Kokai) No. 63-208773), and methods of determining the residual capacity on the basis of the specific gravity of the electrolytic solution (Japanese Patent Laid-open (Kokai) Nos. 56-24768, 57-88679 and 57-210578).

The capacity of a battery is dependent also on the charge and discharge history of the battery. For example, the capacity of nickel-cadmium batteries and nickel-metal hydride batteries decreases due to memory effect if shallow discharge and charge are repeated. In lithium batteries, lithium is accumulated on the positive electrode and material forms on the negative electrode to degrade the battery. If the charge/discharge balance is destroyed, the power of the lithium battery must be discharged after due consideration of the charge capacity. It is very important with combination batteries to know the charged capacity. Since the variation of the voltage of nickel-metal hydride batteries, as compared with that of nickel-cadmium batteries, in the final stage of charging is obscure, nickel-metal hydride batteries may be overcharged causing drying of the electrolyte or increase in the internal pressure and entailing safety problems unless nickel-hydrogen batteries are charged after due consideration of the discharge capacity. Since the capacity of batteries is greatly dependent on temperature, charging rate and discharging rate, the charge and discharge history of batteries must be taken into account. Charging systems have been studied with such problems in view. For example, a charging system disclosed in Japanese Patent Laid-open (Kokai) No.4-308429 charges a battery after detecting the fully discharged condition of the battery from the end voltage or time to solve problems due to memory effect, and a charging system disclosed in Japanese Patent Laid-open (Kokai) No. 61-81139 charges a battery after detecting the fully discharged condition of the battery from the end voltage or time to prevent overcharge.

A method of determining the residual capacity of a battery on the basis of the specific gravity of the electrolyte is applicable only to lead-acid batteries. Although a method of managing the residual voltage on the basis of the voltage is effective when applied to lead-acid batteries and lithium batteries the voltage of which varies comparatively widely during charging and discharging, the same is unsuitable for application to nickel-cadmium batteries and nickel-metal hydride batteries the residual capacity of which cannot be determined on the basis of only the voltage. It is difficult to predict the residual capacity accurately on the basis of current and temperature or on the basis of time besides on the basis of voltage under operating condition where discharge rate changes. When managing the residual capacity of a battery on the basis of measured internal resistance or capacitance, it is difficult to determine whether the increase of the internal resistance is due to the deterioration of the battery or whether the increase of the internal resistance is due to the exhaustion of the battery unless the mode of deterioration of the battery is precisely known. The management of the residual capacity on the basis of integrated current, charging efficiency, discharging efficiency and temperature characteristics allows one to predict the residual capacity considerably accurately, however, it is difficult to determine the residual capacity unless the capacity of the battery is known when the capacity of the battery is reduced greatly or the self-discharge of the battery is large. Since the prior art methods of determining the residual capacity of batteries are applicable only to specific batteries, respectively and hence each battery requires a specific control.

The system proposed to eliminate memory effect (Japanese Patent Laid-open (Kokai)No. 4-308429) and the system proposed to prevent overcharge (Japanese Patent Laid-open (Kokai) No. 61-81139) are intended to suppress the deterioration of a battery and to simplify a charging method when the battery is used as the power supply of portable apparatuses. Such a charge/discharge control method taking the characteristics and the history of batteries has not been proposed.

The difference between diurnal power demand and nocturnal power demand has progressively increased in recent years, and diurnal power demand in summer is approaching the upper limit of total power generating ability of power stations. Power storage techniques are effective means for solving problems attributable to the wide daily and seasonal variation of power demand. For example, electric power storage methods published in Denki Gakkai-shi, Vol. 111, No. 3, pp. 185–188 (1992) and such install large-capacity secondary batteries in a substation to store (to charge) surplus electric power generated in the nighttime and to deliver (discharge) the stored power when power demand reaches a peak in the daytime. However, nothing is mentioned about concrete means for the maintenance of soundness of the secondary batteries and the effective use of residual power.

SUMMARY OF THE INVENTION

Accordingly, it is an object of the present invention to provide a distributed electric power storage system capable of maintaining the soundness of secondary batteries and of effectively using residual power.

The present invention provides a secondary battery electric power storage system comprising a secondary battery connected to a load, and a connector unit capable of being connected to a power system and connected to the secondary battery and a plurality of loads, characterized by a controller for controlling the connection unit according to information about the secondary battery and the plurality of loads.

At least either the plurality of loads or the secondary battery is connected to the controller by an information transmitting means. A secondary battery electric power storage system comprising:

a secondary battery connected to a load;

a detecting device for detecting a residual electric power of said secondary battery;

a connection unit connected to a power source and to said secondary battery;

a control unit connected to said charge/discharge unit; and a signal line for transmitting information on said load and said secondary battery to said control unit, wherein said connection unit discharges electric power of said secondary battery to said load when said residual electric power is larger than a predetermined value and when the residual electric power is smaller than the predetermined value, the electric power is discharged to said power system or said load through said connection unit, prior to charging of said secondary battery. A secondary battery electric power storage system , wherein said secondary battery is connected to a plurality of loads, and wiring is provided for signaling and for transmitting information on said loads and said secondary battery to said control unit, wherein said connection unit distributes electric power of said secondary battery among said loads when said residual electric power is larger than the predetermined value. A secondary battery electric power storage system comprising: a secondary battery connectable to a load; a connection unit connectable to the secondary battery, said connection unit being connectable to a power system and either a plurality of loads or a plurality of electric power strage units; a detecting device for detecting a residual electric power in the secondry battery; and a control unit for controlling the connection unit on the basis of information from the secondary battery and at least one of the loads or electric power strage units, wherein electric power in the secondary battery is discharged to at least one of the loads when the residual electric power is larger than the predetermined value, and the residual electric power is discharged to the power system or to at least one of the loads or electric power strage units when the residual electric power is smaller than the predetermined value, prior to charging of the secondary battery. A secondary battery electric power storage system comprising: a secondary battery connected to a load; a connection unit connectable to the secondary battery, said connection unit being connectable to a power system and either a plurality of loads or a plurality of electric power strage units; a detecting device for detecting a residual electric power in the secondry battery; and a control unit for controlling the connection unit on the basis of information from the secondary battery and at least one of the loads or electric power strage units, wherein electric power in the secondary battery is discharged to at least one of the loads when the residual electric power is larger than the predetermined value, and the residual electric power is discharged to the power system or to at least one of the loads or electric power strage units when the residual electric power is smaller than the predetermined value, prior to charging of the secondary battery. A secondary battery electric power storage system, wherein said connection unit is connected to either a plurality of loads or a electric power strage units, and said signal line for transmitting information on either said loads or said electric power strage units and said secondary battery to said control unit, wherein said connection unit distributes electric power of said secondary battery among said either said loads or said electric power strage units when said residual electric power is larger than the predetermined value.

The secondary battery electric power storage system is characterized by a signal line to transmit the information about the operating condition of the plurality of loads to the controller, and a signal line for transmitting information about the surplus electric power of the secondary battery to the controller.

The secondary battery electric power storage system may be provided with at least either a measuring means associated with the plurality of loads to measure information about operating condition or a measuring means associated with the secondary battery to measure information about the surplus electric power. The measuring means may be ordinary measuring means (sensors) suitable for the purpose of measurement.

The secondary battery electric power storage system is characterized also by the connection of a plurality of electric power storage units to the connection unit, and the connection of the plurality of electric power storage units and the controller by an information transmitting means.

The plurality of electric power storage units may be provided with a measuring means for measuring the condition of power storage. The measuring means may be an ordinary measuring means (sensor) suitable for the purpose of measurement.

The present invention is applicable to, for example, the secondary batteries of electric vehicles, the second batteries of hotwater supply systems, secondary batteries for illumination, secondary batteries for air-conditioning systems, buildings, factories, apartment houses, cities and general residential buildings provided with power supply facilities, such as emergency power supplies, and transport facilities using electric power.

Desirably, the controller is provided with a clock or a timer.

The present invention provides also a secondary battery electric power storage system comprising a secondary battery connected to loads, and a connection unit capable of being connected to a power system, and connected to the secondary battery and at least either a plurality of loads or a plurality of electric power storage units, characterized in that a load to which power is to be fed and the capacity are selected on the basis of information about the secondary battery, the plurality of loads and the plurality of electric power storage units, and the surplus electric power remaining in the secondary battery after feeding the power stored in the secondary battery to the loads is fed to the selected load.

A load to which electric power is to be fed and the capacity are selected on the basis of at least one of information about the surplus electric power of the secondary battery, information about the operating condition of the plurality of loads and information about the power storage condition of the electric power storage units, and power is fed to the selected load.

The electric power storage system of the present invention may employ the following secondary battery electric power storage system for controlling the power system or operations for charging and discharging electric power stored in a secondary battery and a plurality of electric power storage units.

The present invention provides a electric power storage system comprising a connection unit connectable to a power system, and connected to at least either a plurality of loads or a plurality of electric power storage units, a controller for controlling the connection unit, and a connecting means for connecting a secondary battery, characterized in that the controller controls the connection unit on the basis of information from at least one of the plurality of loads, the plurality of electric power storage units and the connecting means.

The secondary battery electric power storage system is characterized also by an information transmitting means interposed between at least one of the plurality of loads, the plurality of electric power storage units and the connecting means, and the controller. A secondary battery is connected for charging and discharging to the secondary battery power storage system to use power effectively.

At least one of the plurality of loads, the plurality of electric power storage units and the connecting means is provided with measuring means for measuring various values, associated with the information transmitting means. The information transmitting means transmits information measured by the measuring means.

The secondary battery to be employed in the present invention is provided with a measuring means for measuring the amount of electric power charged in the secondary battery and the amount of electric power discharged from the secondary battery, and a computer that calculates the residual power of the secondary battery.

More concretely, the secondary battery electric power storage system is provided with a measuring means for measuring the condition of the secondary battery, and a computer provided with a memory capable of storing measured data measured by the measuring means, arithmetic programs and information including data on the characteristics of the secondary battery, and a controller for processing the information stored in the memory and information given thereto from external devices, and it is desirable that the information stored in the secondary battery can be transmitted by the information transmitting means.

The secondary battery to be used by the present invention is at least one of secondary batteries including lead-acid batteries, nickel-cadmium batteries, nickelhydrogen batteries and lithium batteries, or any combination of these secondary batteries. The secondary battery is provided with a storage device capable of storing at least the measured data and the arithmetic programs.

The plurality of electric power storage units are at least a plurality of secondary batteries, such as lead-acid batteries, nickel-cadmium batteries, nickel-metal hydride batteries or lithium batteries, a plurality of heat storage and heat exchanger systems, a plurality of superconducting type electric power storage systems, or any combinations of these batteries and electric power storage systems.

The connection unit is provided with an ac-dc conversion means and a switching means. The ac-dc conversion means, such as a thyristor, enables the control of power factor. The switching means switches circuits connecting the power system to the secondary battery, the plurality of loads and the plurality of electric power storage units depending on the operating condition of the surrounding loads. When necessary, the secondary battery electric power storage system is provided with a power measuring means for measuring the amount of power fed or received through the connection unit, such as a measuring means for measuring the amount of charged electric power and the amount of discharged electric power, and an information transmitting means for transmitting the measured data to the controller for controlling the connection unit. The secondary battery or the plurality of electric power storage units may be provided with a measuring means for measuring the amount of charged electric power and that of discharged electric power.

The means for measuring the amount of charged electric power and that of discharged electric power is a sensor, such as an ammeter voltmeter or a Coulomb meter.

The controller for controlling the connection unit is capable of selecting a load to which the secondary battery and the electric power storage units feed power on the basis of information about the amount of the surplus electric power of the secondary battery, operating condition of the plurality of loads and the power storage condition of the plurality of electric power storage units. The secondary battery power storage system may be provided with a calculating means for calculating the amount of charged electric power and that of discharged electric power on the basis of information from the secondary battery, the plurality of loads and the plurality of electric power storage units and with a memorijing means.

The information about the operating condition of the plurality of loads is information about power necessary for operating the plurality of loads or the current power demand of the plurality of loads. Preferably, information about scheduled operating time and such is used.

The information transmitting means is, for example, a signal line. Information may be transmitted by means of radiowaves.

The information about the surplus electric power is, for example, a measured amount of surplus electric power, data on optimum charge and discharge characteristics (charge and discharge modes) and the charge and discharge history of the secondary battery.

The plurality of loads has at least one load, and the plurality of electric power storage units has at least one electric power storage unit.

A secondary battery electric power storage system in accordance with the present invention comprises a secondary battery mounted on a load, such as an electric vehicle, a connection unit capable of being connected to a power system, such as a charge stand, and connected to the secondary battery, a plurality of electric power storage units capable of being connected to the power system, and connected through the connection unit in parallel to the secondary battery, a plurality of loads connected to the plurality of electric power storage unit, a plurality of loads connected to the connection unit.

The connection unit capable of being connected to the power system may be connected to the secondary battery, the plurality of loads and the plurality of electric power storage units.

The present invention is capable of controlling charge and discharge of the plurality of loads, the plurality of electric power storage units and the secondary battery on the basis of information from the plurality of loads, the plurality of electric power storage units and the secondary battery.

Concretely, necessary power can be measured by a power measuring means on the basis of the operating condition of the plurality of loads. The surplus electric power of the secondary battery, the power storage condition of the plurality of electric power storage units, and the discharge characteristic and the available capacity of the battery are determined, a load to which power is to be fed is selected from among the plurality of loads or the plurality of electric power storage units, and the surplus electric power can be fed through the connection unit to the selected load.

Naturally, power may be stored in the electric power storage units and then power may be fed from the electric power storage units to the plurality of loads.

Thus the surplus electric power can be effectively distributed and the residual power can be discharged after determining the amount of available power from the residual power. Therefore, the soundness of the battery can be secured and discharge control can be efficiently carried out.

When charging the secondary battery, the residual capacity of the secondary battery is determined before charging, and whether the secondary battery is to be charged or whether the secondary battery is discharged is determined on the basis the residual capacity of the secondary battery.

The intrinsic optimum charge and discharge characteristics of the secondary battery, and the power demand of the plurality of loads or the power storage condition of the plurality of electric power storage units are measured and a load to which power is to be fed is selected. When the plurality of loads has a plurality of loads, it is preferable to measure the power demand of each load. When the plurality of electric power storage units has a plurality of electric power storage units, it is preferable to determine the power storage condition of each electric power storage unit.

For example, a load to which power is to be fed and the amount of power to be fed are determined selectively after examining power demand to see if the power demand can be supplied by the secondary battery and to see if the output current density (large-current discharge or small-current discharge) is appropriate to the secondary battery, and then the connection unit connects the secondary battery to the selected load to feed power to the latter by orders of controller.

When the timer is used, the soundness of the battery can be secured and electric power can be efficiently used by accumulating electric power in night period rate hours in the night and using the accumulated electric power in the daytime.

More concretely, for example, the secondary battery is charged through the connection unit with electric power during night period rate hours, the surplus electric power of the secondary battery is fed (discharged) to the connection unit connected to the secondary battery, and electric power is fed (discharged) through the connection unit to the plurality of electric power storage units, the plurality of loads connected to the plurality of electric power storage units and the plurality of loads connected to the connection unit in day period rate hours. Inexpensive night period rate electric power can be stored and used, and then the stored electric power can be sold through the connection unit that can be connected to the secondary battery to consumers in day. When selling the stored electric power, it is preferable to determine the power demand of the plurality of loads on the basis of information about operating condition received from a plurality of electric power storage units or the plurality of loads by the controller connected to the connection unit connected to the secondary batteries, to select a load to which electric power is to be fed, taking into consideration the available power capacity of the secondary battery, and to feed the surplus electric power of the secondary battery through the connection unit to the selected load.

The soundness and the original power capacity of the battery can be known by discharging the surplus electric power. The original power capacity of the battery can be known from charged capacity after discharge of nearly 100% of the full capacity of the battery (nearly exhausted state). it is desirable, if possible, to know the capacity of the battery every time the battery is discharged or charged to know the soundness of the battery.

Desirably, the secondary battery employed in the present invention is provided with, for example, measuring means (sensors) for acquiring data, an A/D converter for converting the data acquired by the measuring means and giving the converted data to a computer, a memory storing data on the charge and discharge history, arithmetic programs, an indication program and data on the standard characteristics, and a controller for processing the information stored in the memory and information placed into the memory by external devices. These components may be integrally combined with the battery.

For example, the arithmetic programs and the indication program are an arithmetic program defining a procedure for determining discharged capacity by integrating discharge current, an arithmetic program defining a procedure for determining charged capacity by integrating charge current, an arithmetic program defining a procedure for determining converted charged capacity, i.e., available capacity under a discharge rate and a temperature condition at the time when discharge current data is received from the discharge efficiency and the temperature characteristic, determined by converting charged capacity in a real-time mode, an arithmetic program defining a procedure for determining surplus electric power discharged capacity by integrating surplus electric power discharge current data, and an indication program defining a procedure for indicating the surplus electric power discharged capacity determined by the procedure defined by the arithmetic program.

Discharge current data, discharge voltage data and discharge temperature data on the discharge history, are measured by measuring means (sensors) when the secondary battery feeds electric power to the loads, and the measured data are transferred through an A/D converter to a computer provided with a memory and a controller. Charging current data, charge voltage data and charge temperature data on the charge history, are measured when the secondary battery is charged with electric power through the connection unit connected to the secondary battery in the night, and the measured data are transferred through the A/D converter to the computer. Surplus electric power discharge current data, surplus electric power discharge voltage data and surplus electric power discharge temperature on surplus electric power discharge history, are measured by sensors when the secondary battery discharges surplus electric power through the connection unit connected to the secondary battery, and the measured data are transferred through the A/D converter to the computer. The soundness of the battery can be known from those measured data. A discharged capacity discharged to the loads and a surplus electric power discharged capacity discharged to the connection unit can be known from the discharge current data and the surplus electric power discharge current, and the discharge operation of the secondary battery can be controlled so that the battery may not be discharged to a voltage below the final discharge voltage, i.e., so that the secondary battery may not be overdischarged, by using the discharge voltage data and the surplus electric power discharge voltage data. The charged capacity charged into the secondary battery can be known from the charge current data. The increase of the voltage of a lithium battery to its final charge voltage can be known from the charge voltage data and hence the overcharge of the lithium battery can be prevented. The final charge voltage of a nickel-cadmium battery can be known from the variation of the voltage in the final stage of charging operation and hence charging can be terminated before the nickel cadmium battery is overcharged.

Unlike a nickel-cadmium battery, a nickel-metal hydride battery has a small voltage variation in the final stage of charging. Therefore, it is desirable to take temperature variation into consideration in addition to voltage variation in determining the time to stop charging to prevent overcharge. As regards other kinds of batteries, abnormal rise of temperature is an indication of the abnormal condition of the batteries. Since charging efficiency and discharging efficiency are dependent on temperature, it is preferable to use temperature data in correcting charged capacity and discharged capacity because charged capacity and discharged capacity are dependent on temperature.

Desirably, the aforesaid data are corrected for charging rate, discharging rate and temperature. The standard characteristic data, such as the inherent charging efficiency, discharging efficiency and temperature characteristic, of the secondary battery are stored in the memory. The charge current data and the discharge current data given to the A/D converter are integrated to determine charged capacity and discharged capacity. The charged capacity is converted in a real-time mode into a converted charged capacity, i.e., a capacity available at the discharge rate and under the temperature condition at the time when the discharge current data is obtained, on the basis of the charging efficiency, the discharging efficiency and the temperature characteristic stored in the memory. The discharged capacity is subtracted from the converted charged capacity determined in the real-time mode to determine a residual capacity. Thus, the residual capacity at the current temperature and at the current discharge rate can be indicated. For example, since the possible distance of travel of an electric vehicle is dependent on the condition of the road, namely, the possible distance of travel along a downhill is longer than that along an uphill, the possible distance of travel can be estimated on the basis of the discharging efficiency according to the condition of the road, and the estimated possible distance of travel can be indicated.

Since the discharging efficiency is dependent on temperature and is subject to seasonal variation, a possible distance of travel determined by taking into consideration the temperature characteristic can be indicated.

Surplus electric power discharge capacity can be determined by integrating the surplus electric power discharge current data and the surplus electric power discharge capacity can be indicated. Since the surplus electric power discharge capacity is selling electric energy for sale, the surplus electric power discharge capacity is transferred to the connection unit connected to the secondary battery and the power system, the plurality of electric power storage units or the plurality of loads. Preferably the connection unit is capable of measuring and indicating the capacity.

It is desirable to discharge the surplus electric power from the secondary battery in a mode conforming to optimum discharge conditions for the secondary battery to secure the soundness of the secondary battery and to extend the cycle life of the secondary battery. It is preferable to discharge the surplus electric power from the secondary battery in conformance with optimum discharge conditions stored in the memory when the surplus electric power is discharged to the connection unit connected to the secondary battery and connectable to the power system. The optimum charge and discharge conditions are pieces of information about a discharge method specifying, for example, at least one of maximum discharge capacity, discharge current, discharge voltage, discharge time and a lower limit voltage. More concretely, discharging conditions as battery characteristic data including discharge modes, such as a constant-current discharge mode, a constant-voltage discharge mode, a pulse discharge mode and combinations of those discharge modes, an optimum current, an optimum voltage, and discharge cutting mode, such as a time-cut mote and a voltage-cut mode, is stored beforehand in the memory. Charging information specifying charging conditions similar to the discharging conditions are used for charging. If even one of the batteries of a battery set is deteriorated, the deteriorated battery will be overdischarged and the cycle life of the same is shorted significantly. It is desirable to use a control method determined by taking into consideration the type the scale and the security of the battery to execute time-cut or voltage-cut on the basis of monitored voltage variation.

The available discharge capacity that can be discharged in the future (next) discharge cycle and the cycle life of the secondary battery can be estimated from the past charge capacities of the secondary battery and the mode of change of charged capacity. Causes of reduction of the capacity of the secondary battery, such as the exhaustion of the electrolyte, the deterioration of the positive electrode and the deterioration of the negative electrode, can be determined from the mode of reduction of the capacity. Overdischarge of the battery can be prevented by determining the available discharge capacity and the possible discharge time of the battery and discharging the surplus power accordingly. Similarly, the secondary battery is charged in a mode conforming to the optimum charge conditions stored in the memory when charging the secondary battery through the connection unit at night, in which overcharge of the secondary battery can be prevented by determining the available discharge capacity and the possible discharge time, and charging the secondary battery accordingly.

It is desirable to determine beforehand surplus electric power discharge hours. For example, the discharge of the surplus electric power is interrupted when the surplus electric power is not discharged completely. The charge capacity determined in the preceding charge cycle is used as charge capacity. Preferably, the surplus electric power discharge capacity is determined on the basis of the residual capacity, taking into consideration the type of the battery to secure the soundness of the battery. For example, since a nickel-cadmium battery and a nickel-metal hydride battery are subject to large self-discharge and have a memory effect, it is preferable to discharge 95% to 100% of a discharge capacity in a mode conforming to optimum discharge conditions revised for the future available discharge capacity of the batteries when the residual capacity is in the range of 0% to 85% of the charge capacity. When the residual capacity is 85% or above of the charge capacity, it is better not to discharge the surplus electric power. Thus, charging and discharging are simplified and the memory effect can be prevented. Since a lithium battery or the like is subject to a comparatively small self-discharge and the cycle cycle life of a lithium battery or the like is reduced when the same is discharged deep, it is desirable to discharge the surplus electric power corresponding to 80% to 95% of the discharge capacity in a mode conforming to optimum discharge conditions revised for the available discharge capacity of the battery, when the residual capacity is in the range of 5% to 80% of the charge capacity. When the residual capacity is less than 5% of the charge capacity, it is better not to discharge the surplus electric power because further discharge reduces the cycle life of the battery. When the residual capacity is 80% or above of the charge capacity, it is desirable not to discharge the surplus electric power to simplify charging and discharging.

The whole capacity of battery can be known at every discharge and the residual capacity of the battery can be accurately determined when the surplus electric power is discharged with the performance of the battery being taking into consideration. The cycle life of the battery and the future capacity of the battery can be estimated from the whole capacity of the battery and the residual capacity. Accordingly, connection unit control can be carried out according to the change of the performance of the battery and thereby the soundless of the battery is enhanced.

Charging of the battery with the inexpensive night period rate electric power in the nighttime and using the surplus electric power in the daytime are economically advantageous.

DETAILED DESCRIPTION OF THE PREFERRED EMBODIMENTS

Preferred embodiments of the present invention will be described in detail hereinafter.

The embodiments are illustrative and not restrictive.
First Embodiment

Figure 1:
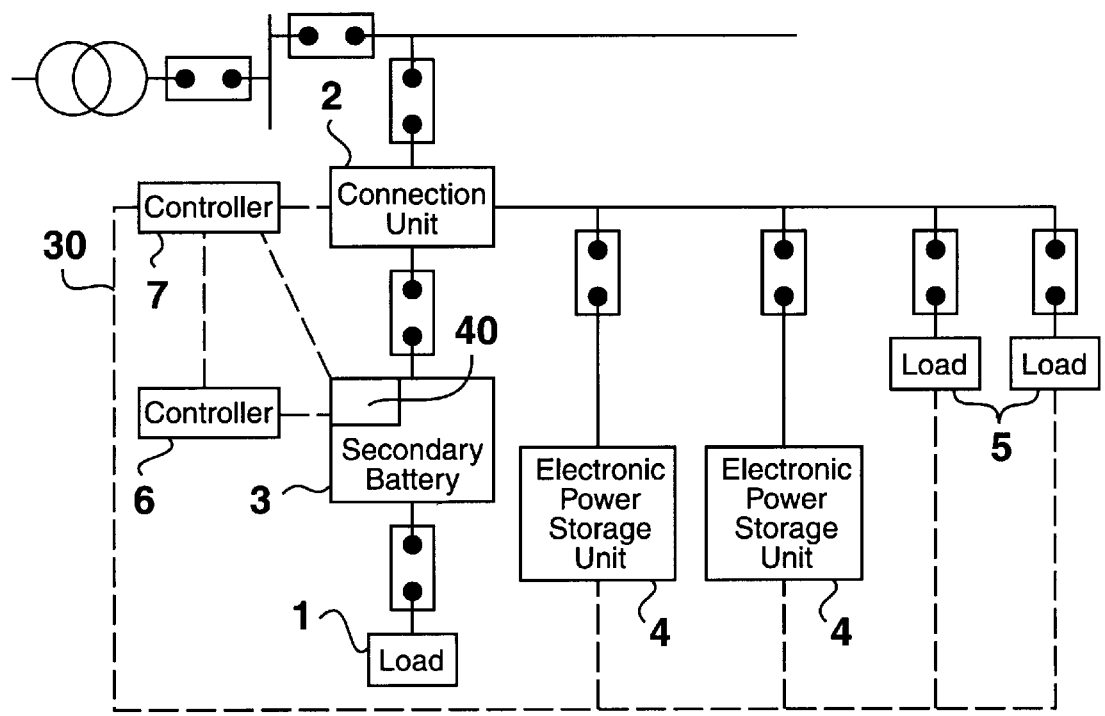
FIG. 1 is a block diagram of a secondary battery electoric power storage system in accordance with the present invention.

FIG. 1 shows a secondary battery electric power storage system in a first embodiment according to the present invention. Although the first embodiment is one of the best modes for carrying out the invention, the present invention is not limited thereto. Referring to FIG. 1, a secondary battery load 1 and a connection unit 2 connectable to a power system are connected to a secondary battery 3. A plurality of electric power storage units 4 are placed in parallel combination with the connection unit 2 connected to a power supply system. A plurality of loads 5 are connected to the connection unit 2 or the electric power storage units 4. A signal line 30 indicated by broken lines is connected to a controller 7 included in the connection unit 2. Ditecting device 40 detect a residual electric power in the secondry battery.

When necessary, the secondary battery electric power storage system is provided with a means, not shown in FIGS. 1 to 4, for supplying electric power directly from the power supply system to the loads 5 or the electric power storage units 4, bypassing the connection unit 2. When the secondary battery electric power storage system is provided with such a means, it is desirable that the secondary battery electric power storage system is provided with a signal line for transmitting signals representing measured values, such as the amount of electric power used to the controller 7 of the connection unit 2. Amounts of electric power applied to and delivered from the secondary battery 3 and the electric power storage units 4 are measured by measuring devices and measured data is sent through the signal line to the controller 7 of the connection unit 2.

The secondary battery 3, the electric power storage units 4 and the loads 5 are provided with sensors (measuring means).

First the secondary battery 3 is connected to the connection unit 2 to charge the secondary battery 3 with night period rate electric power. After the secondary battery has been charged, the secondary battery 3 is connected to the secondary battery load 1 to discharge the secondary battery 3. After discharging, the secondary battery 3 is disconnected from the secondary battery load 1 and connected to the connection unit 2 to discharge the surplus electric power of the secondary battery 3 in the day period rate hours. A controller 6 included in the secondary battery 3 controls the secondary battery 3 for discharging the surplus electric power remaining after charging the secondary battery load 1, i.e., the residual capacity in a mode conforming to optimum discharging conditions in the day period rate hours. The discharge of the surplus electric power is stopped in the night period rate hours and the secondary battery is charged. In this state, the charge capacity does not correspond to the capacity of the battery because the battery has the residual capacity. Therefore, the charge capacity used in the preceding charge cycle is used as the charge capacity to be taking into consideration in indicating the residual capacity. The controller 7 of the connection unit 2 measures the amounts of electric power required by the electric power storage units 4 or the loads 5, selects the electric power storage unit or the load and controls the secondary battery 3 to supply the surplus electric power to the selected electric power storage unit or the load.

Figure 2:
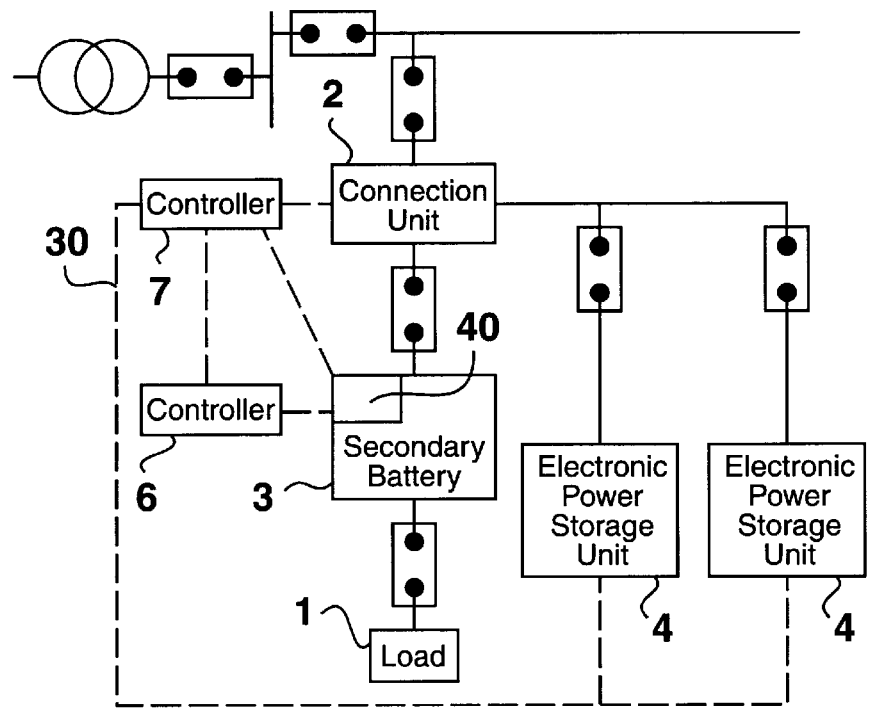
FIG. 2 is a block diagram of a secondary battery electoric power storage system in accordance with the present invention.

FIG. 2 shows an embodiment of the present invention. In this embodiment, a secondary battery load 1 and a connection unit 2 connectable to a power system are connected to a secondary battery 3, and electric power storage units 4 are placed in parallel combination with the connection unit 2.

Figure 3:
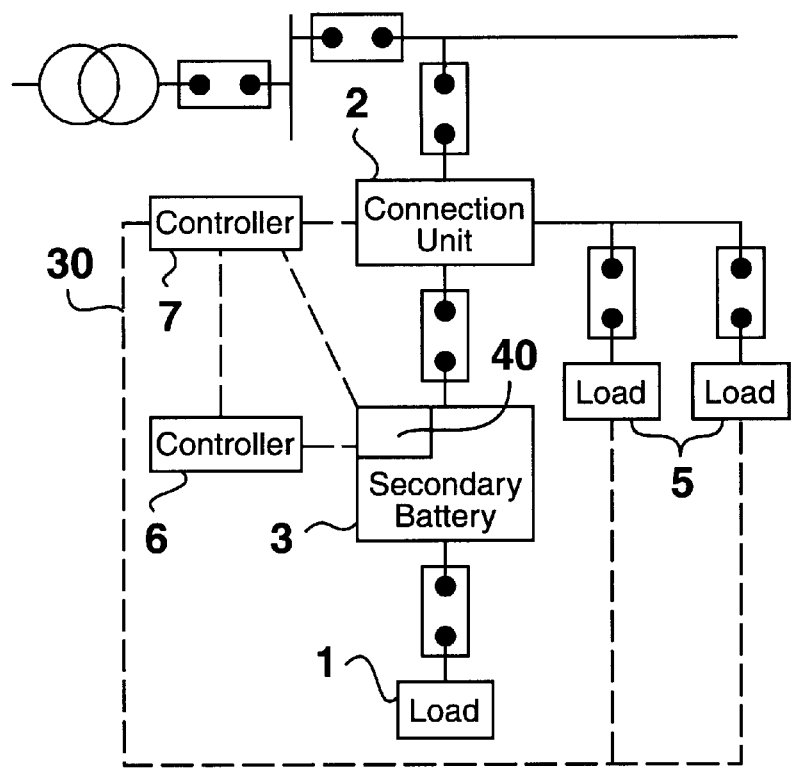
FIG. 3 is a block diagram of a secondary battery electoric power storage system in accordance with the present invention.
Figure 4:
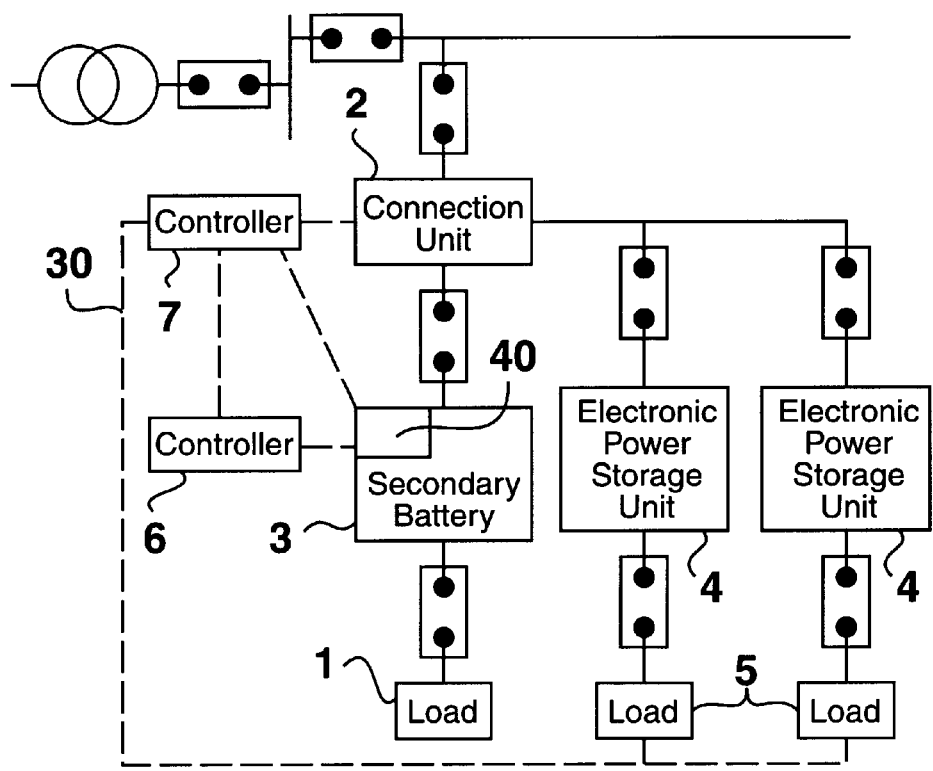
FIG. 4 is a block diagram of a secondary battery electoric power storage system in accordance with the present invention.

FIG. 3 shows an embodiment of the present invention. In this embodiment, a secondary battery load 1 and a connection unit 2 connectable to a power system are connected to a secondary battery 3, and loads 5 are connected to the connection unit 2. FIG. 4 shows an embodiment of the present invention. In this embodiment, a secondary battery load 1 and a connection unit 2 connectable to a power system are connected to a secondary batter 3, and series circuits each of a electric power storage unit 4 and a load 5 are placed in parallel connection with the connection unit 2.

Second Embodiment

Figure 5:
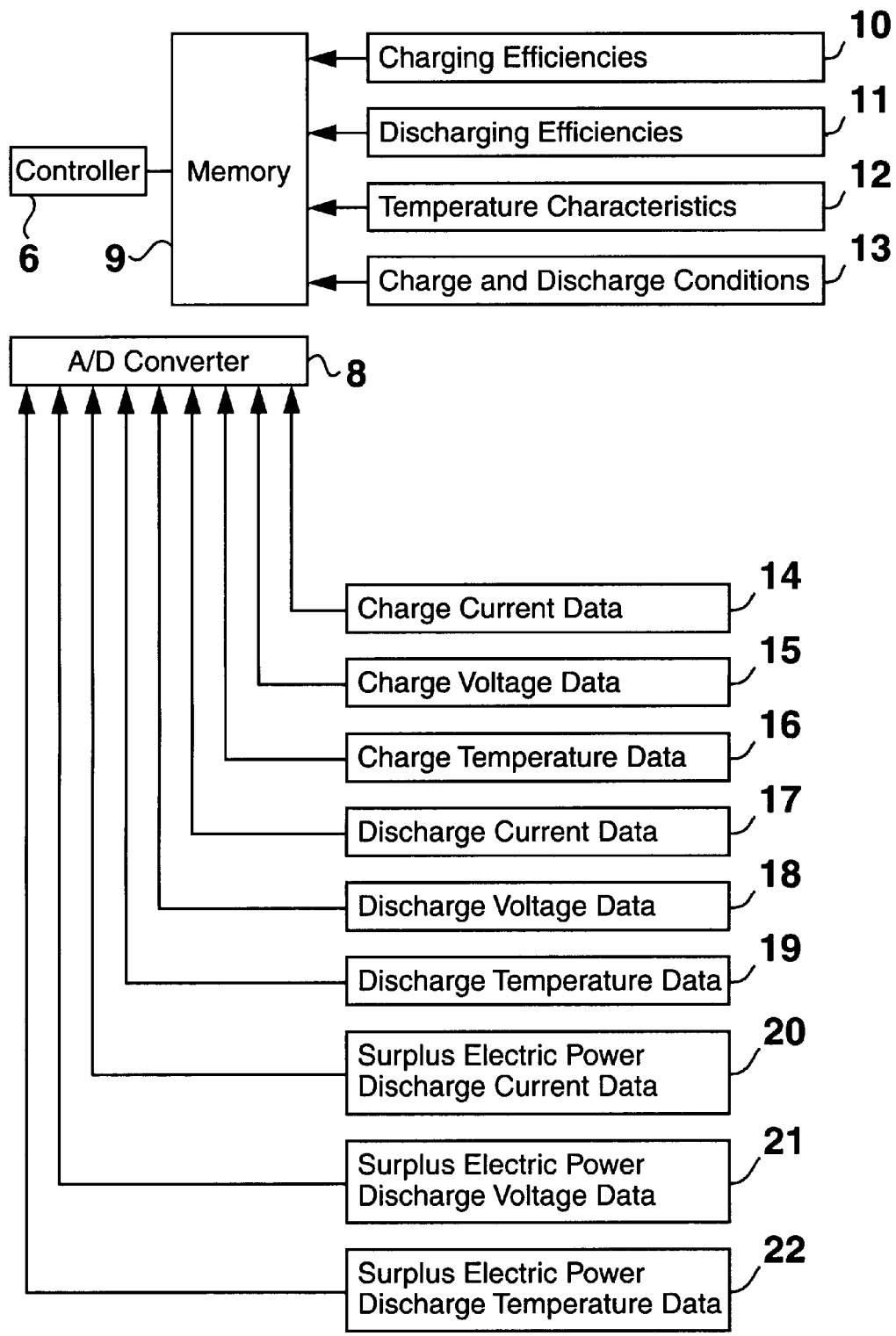
FIG. 5 is a flow chart of a procedure for controlling a secondary battery, in accordance with the present invention.

FIG. 5 is a flow chart of a control procedure to be carried out by the controllers 6 of the secondary batteries 3 of FIGS. 1 to 4. The control procedure will be described hereinafter with reference to FIGS. 1 to 5. The secondary battery 3 is provided with the controller 6, an A/d converter 8 and a memory 9. The memory 9 is capable of storing standard characteristic data on the intrinsic characteristics of the secondary battery 3 including charging efficiencys 10, discharging efficiencys 11, temperature characteristics 12 and optimum charge and discharge conditions 13. The optimum charge and discharge conditions 13 specify charge and discharge modes, such as a constant-current charge mode, constant discharge mode, a constant-voltage discharge mode and a constant -voltage discharge mode, currents and voltages, cut voltages, charge capacities, discharge capacities, charge times and discharge times.

When the secondary battery 3 is connected to the connection unit 2 for charging, the secondary battery 3 is controlled for charging according to the optimum charge conditions. At every charge cycle, an A/D converter receives charge operation data including charge current data 14, charge voltage data 15 and charge temperature data 16. The charge voltage data 15 is necessary for terminating charging at a cut voltage. The charge temperature data 16 is used for detecting the final charge stage for a nickel-metal hydride battery. The temperature data 15 is used also for detecting the abnormal condition of the battery when the temperature of the battery rises abnormally. The charge current data 14 is integrated to obtain a charged capacity.

When the secondary battery 3 is connected to the secondary battery load 1 and electric power stored in the secondary battery 3 is discharged into the secondary battery load 1, the A/D converter 8 receives discharge operation data including discharge current data 17, discharge voltage data 18 and discharge temperature data 19. The discharge voltage data 18 is necessary for terminating discharge at a cut voltage. The discharge current data 17 is integrated to obtain a discharged capacity. The discharged capacity is converted in a real-time mode for a discharging rate and a temperature represented by the discharge temperature data 19 into an available discharge capacity, i.e., converted charge capacity, for determining a residual capacity. The residual capacity is obtained by subtracting the discharged capacity from the converted charge capacity.

When the secondary battery 3 is connected to the connection unit 2 to discharge the surplus electric power, the discharge operation of the secondary battery 3 is controlled according to the optimum charge and discharge conditions 13. At every surplus electric power discharging operation, the A/D converter 8 receives surplus electric power discharge operation data including surplus electric power discharge current data 20, surplus electric power discharge voltage data 21 and surplus electric power temperature data 22. The surplus electric power discharge current data 20 is integrated to obtain a surplus electric power discharge capacity, and the surplus electric power discharge capacity is indicated. The surplus electric power discharge capacity can be transferred through the connection unit 2 to the electric power storage units 4 and the loads 5. When selling the surplus electric power, it is preferable to indicate an amount of money corresponding to the surplus electric power when necessary.

Figure 6:
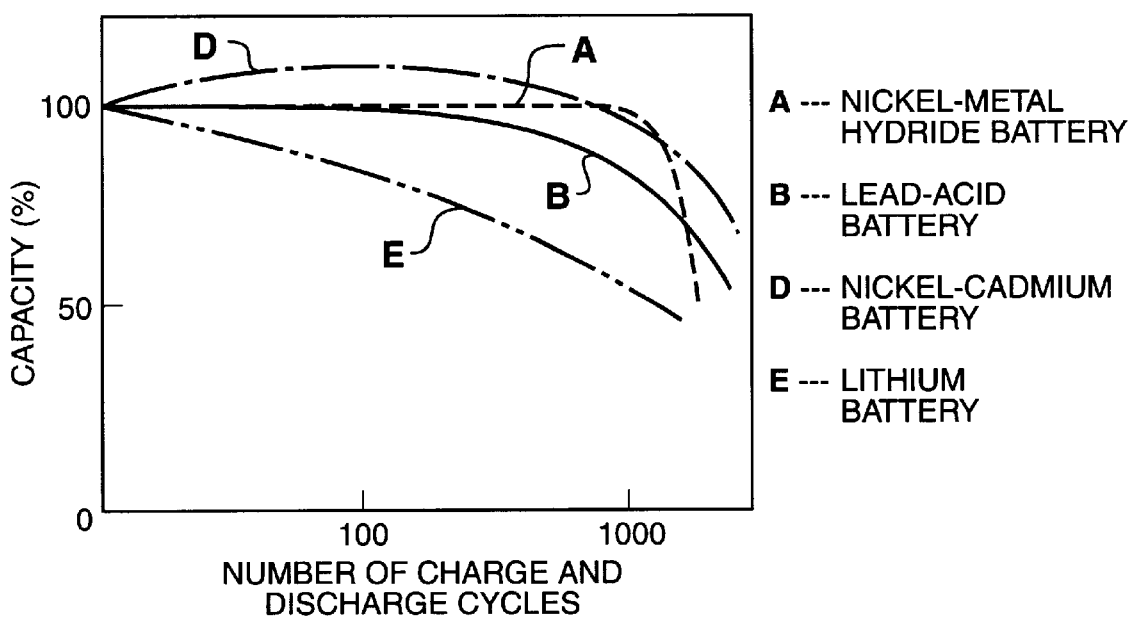
FIG. 6 is a graph showing the connection unit cycle characteristics of secondary batteries in a second embodiment according to the present invention.
Figure 7:
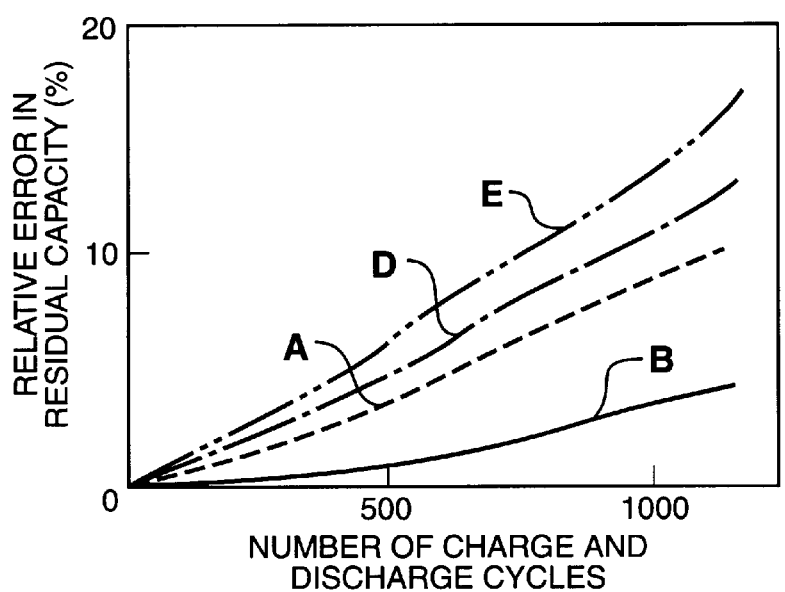
FIG. 7 is a graph comparatively showing residual capacity indications and actual residual capacities in the second embodiment according to the present invention.

FIG. 6 shows the charge and discharge cycle characteristics of secondary batteries and FIG. 7 shows the variation of the difference between residual capacity indication and actual residual capacity with the number of charge and discharge cycles. The capacities of a lead-acid battery B, a nickel-cadmium battery D, a nickel-hydrogen battery A and lithium battery E decrease slightly as the number of charge and discharge cycles increases, and the possible numbers of charge and discharge cycles for those batteries are not less than 1000. The difference between the residual capacity indication and the actual residual capacity is very small.

Third Embodiment

When a secondary battery 3 is a nickel-cadmium battery or a nickel-metal hydride battery, a controller 6 controls the secondary battery 3 for discharging so that 95% to 100% of a discharge capacity corresponding to an available discharge capacity is discharged in a mode conforming to optimum discharge conditions when the residual capacity is 0 to 85% of the charge capacity of the secondary battery 3.

If the residual capacity is 85% or above of the charge capacity, surplus electric power discharge is not performed. When the secondary battery 3 is a lithium battery, the controller 6 controls the secondary battery 3 so that 80% to 95% of a discharge capacity corresponding to an available discharge capacity is discharged in a mode conforming to optimum discharge conditions when the residual capacity is 5% to 80% of the charge capacity. When the residual capacity is 5% or below of the charge capacity, surplus electric power discharge is not performed. When the residual capacity is 80% or above of the charge capacity, surplus electric power discharge is not performed.

Figure 8:
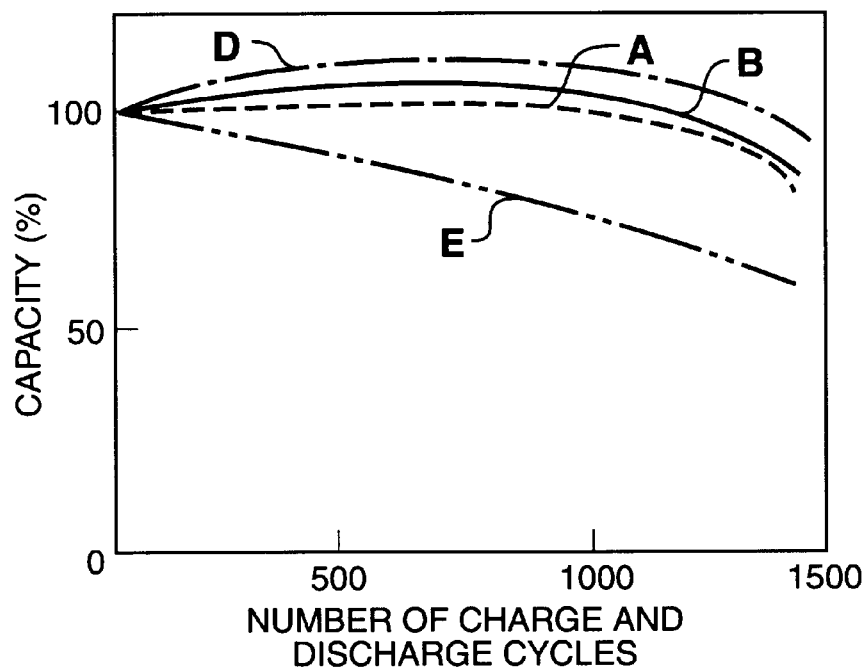
FIG. 8 is a graph showing the connection unit cycles of secondary batteries in a third embodiment according to the present invention.

FIG. 8 shows the charge and discharge cycle characteristics of batteries under the control operation of the controller. The capacities of a nickel-cadmium battery, a nickel-metal hydride battery and a lithium battery decrease scarcely as the number of charge and discharge cycles increases. The possible numbers of charge and discharge cycles for those batteries are not less than 1200.

COMPARATIVE EXAMPLE 1

Figure 9:
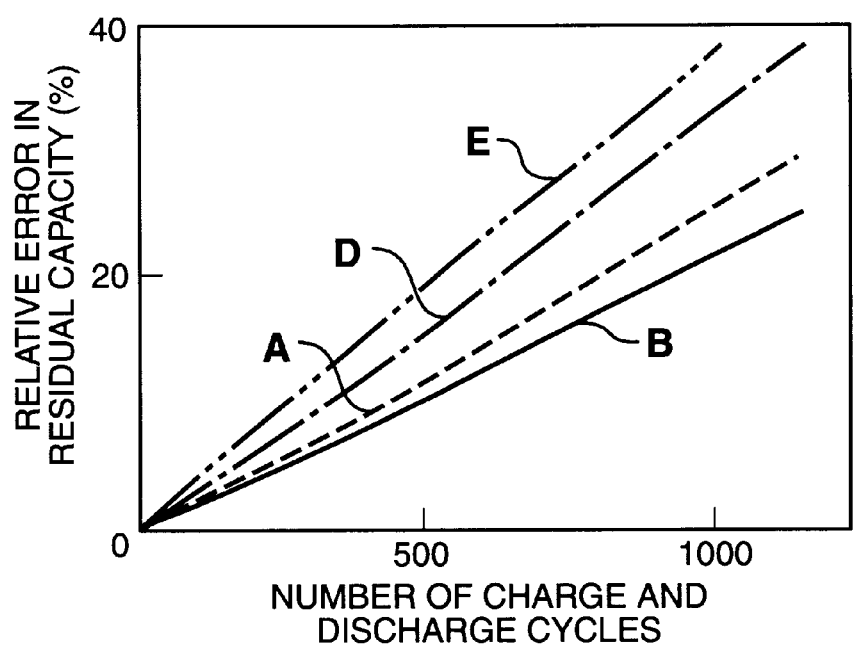
FIG. 9 is a graph comparatively showing residual capacity indications and residual capacities in a comparative example 1.
Figure 10:
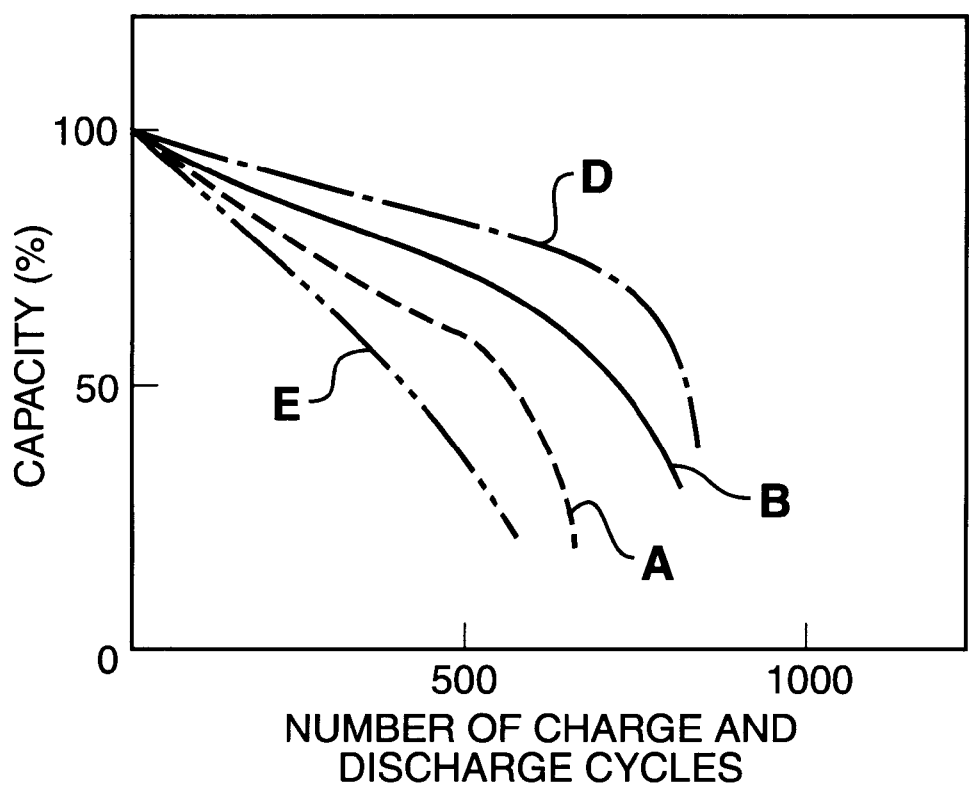
FIG. 10 is a graph showing the connection unit cycle characteristics of secondary batteries in the comparative example 1.

In a secondary battery electric power storage system in a comparative example 1, a secondary battery load 1 and a connection unit 2 are connected to a secondary battery 3. The secondary battery 3 is connected to the connection unit 2 and the secondary battery 3 is charged with night period rate electric power. Then, the secondary battery 3 is connected to the secondary battery load 1 and the electric power stored in the secondary battery 3 is discharged into the secondary battery load 1. After discharging, the secondary battery 3 is disconnected from the secondary battery load 1 and is connected to the connection unit 2 to charge the secondary battery 3 with night period rate electric power. The residual capacity of the secondary battery is determined by subtracting a discharged capacity from an initial capacity. FIG. 9 shows the difference between residual capacity indication and actual residual capacity. As is obvious from FIG. 9, the difference increases as the number of charge and discharge cycles increases and, consequently, accurate residual capacity indication is impossible. FIG. 10 shows the charge and discharge cycle characteristics of batteries. As is obvious from FIG. 10, the capacities of a lead-acid battery, a nickel-cadmium battery, a nickel-metal hydride battery and a lithium battery decrease greatly as the number of charge and discharge cycles increases, and the lives of those batteries are in the range of 500 to 700 charge and discharge cycles.

As is apparent from the foregoing description, according to the present invention, the soundness of the battery can be secured, and charging and discharging are carried out efficiently. The secondary battery can be charged with inexpensive night period rate electric power in the night and the surplus electric power can be supplied to loads in the day time.

What is claimed is:

1. An electric vehicle comprising:

a secondary battery (3);

a secondary battery load (1) being connectable to said secondary battery (3); and means (7) for determining an available discharge capacity of said secondary battery (3) such that electric power in the secondary battery (3) is discharged when a determined surplus residual electric power of said secondary battery (3) is within a predetermined range, prior to charging of said secondary battery (3).

2. An electric vehicle comprising:

a connection unit (2) connectable to at least one load (5);

means for connecting said connection unit (2) to a secondary battery (3), said secondary battery (3) being connectable to a secondary battery load (1);

means (7) for determining an available discharge capacity of said secondary battery (3); and control means (6) for controlling said connection unit (2) on the basis of information received from the at least one load (5), such that electric power in the secondary battery (3) is discharged to a selected at least one of said at least one load (5) when a determined surplus residual electric power of said secondary battery (3) is within a predetermined range, prior to charging of said secondary battery (3).

3. An electric vehicle as claimed in claim 2, wherein said connection unit (2) is connectable to the at least one load (5) and to at least one electric power storage unit (4), wherein said control means (6) is for controlling said connection unit (2) on the basis of information received from the at least one load (5) and the at least one electric power storage unit (4).

4. An electric vehicle comprising:

a connection unit (2) connectable to at least one electric power storage unit (4);

means for connecting said connection unit (2) to a secondary battery (3), said secondary battery (3) being connectable to a secondary battery load (1);

means (7) for determining an available discharge capacity of said secondary battery (3); and control means (6) for controlling said connection unit (2) on the basis of information received from the at least one electric power storage unit (4), such that electric power in the secondary battery (3) is discharged to a selected at least one of said at least one electric power storage unit (4) when a determined surplus residual electric power of said secondary battery is within a predetermined range, prior to charging of said secondary battery (3).

* * * * *